(12) United States Patent
Müller

(10) Patent No.: US 7,317,398 B2
(45) Date of Patent: Jan. 8, 2008

(54) SECURITY AND IDENTIFICATION LABEL AND THE PRODUCTION AND USE THEREOF

(75) Inventor: Phillip Müller, Greifensee (CH)

(73) Assignee: Bibliotheca RFID Library Systems AG, Zug (CH)

( * ) Notice: Subject to any disclaimer, the term of this patent is extended or adjusted under 35 U.S.C. 154(b) by 304 days.

(21) Appl. No.: 10/512,436

(22) PCT Filed: Apr. 26, 2002

(86) PCT No.: PCT/CH02/00232

§ 371 (c)(1),
(2), (4) Date: Sep. 12, 2005

(87) PCT Pub. No.: WO03/091754

PCT Pub. Date: Nov. 6, 2003

(65) Prior Publication Data

US 2006/0101272 A1    May 11, 2006

(51) Int. Cl.
*G08B 13/14* (2006.01)
(52) U.S. Cl. .............. 340/572.5; 340/572.2; 340/572.4; 340/572.7
(58) Field of Classification Search ........ 340/572.1, 340/572.2, 572.4, 572.5, 572.7, 539.1, 539.11, 340/667, 10.34, 10.42; 333/206, 246; 343/742, 343/867
See application file for complete search history.

(56) References Cited

U.S. PATENT DOCUMENTS

| | | | |
|---|---|---|---|
| 5,021,778 A * | 6/1991 | Walton | 340/10.34 |
| 5,374,910 A * | 12/1994 | Yamagata | 333/206 |
| 5,699,047 A | 12/1997 | Tsai et al. | 340/572.6 |
| 5,940,362 A | 8/1999 | Plonsky et al. | 369/273 |
| 6,164,551 A | 12/2000 | Altwasser | 235/492 |
| 6,259,413 B1 * | 7/2001 | Schmidt et al. | 343/742 |
| 7,119,705 B2 * | 10/2006 | Manlove et al. | 340/667 |

FOREIGN PATENT DOCUMENTS

| | | |
|---|---|---|
| EP | 913711 | 5/1999 |
| EP | 1 186911 | 3/2002 |

\* cited by examiner

*Primary Examiner*—Van T. Trieu
(74) *Attorney, Agent, or Firm*—Morgan, Lewis & Bockius LLP

(57) ABSTRACT

An object is provided with a label for identifying in a cable-less manner by an electromagnetic radiation. The inventive label comprises at least one antenna receiving an incident electromagnetic signal and characterized reducing the influence of dispersion or straying capacities caused by the object on file remnant properties of the label. Such that the label can be applied to any object, particularly optical or magneto-optical data carriers.

15 Claims, 3 Drawing Sheets

SECURITY AND IDENTIFICATION LABEL AND THE PRODUCTION AND USE THEREOF

FIELD OF THE INVENTION

The present invention relates to a security and/or identification label to be affixed to objects to be secured and/or identified such as, particularly, optical data media such as CDs or DVDs. Furthermore, the invention relates to the manufacture and use of such a label, as well as to an optical data medium with such a label.

DESCRIPTION OF THE RELATED ART

Radio frequency technology is being increasingly used for identification or anti-theft security. In the area of anti-theft security, mostly simple labels are used which are especially inexpensive to manufacture. These feature a resonant circuit which effect absorption when entering a transmittal field appropriately tuned to the characteristic frequency identification (REID) methods are used, for example, to identify objects provided with corresponding labels (so-called REID tags), as well for access control. Here there is not only a single resonant circuit located in the label, but rather the resonant circuit is inked to a corresponding chip in such a manner that an object-specific absorption characteristic can be set. In this way, not only can the intrusion of an object provided with a label into a transmitter field be determined, but rather specific information can be read directly from the label. This information is ascertainable, for example, from the specific absorption measured in the transmitter field.

A distinction is made between so-called passive and active labels. In passive labels the incoming transmitter output is used for the operation of the label, which is to say that the label does not have its own power source. Active labels have their own energy source, mostly a battery, which powers the label. Of particular interest in relation to the present filing application are the passive labels, since they can be manufactured much more inexpensively. Passive RFID labels are also customizable, for example, by individually programming the chips they contain. EEPROM RFIDs are, for example, suitable in this sense. EEPROM stands for "electrically erasable programmable read-only memory."

A problem with such radio frequency methods is the fact that the resonance circuits, in addition to having a good, that is to say long-range, highly selective detection, should also have a high rating (Q factor). At the same time, the absorption effect of the labels themselves in the transmitter field should remain, insofar as possible, unaffected by foreign influences such as disturbances and irregularities in the transmitter field caused by objects located within it, as well as disturbances of the absorption characteristics of the labels.

BRIEF SUMMARY OF THE INVENTION

It is thus an object of the invention to make available a label for the wireless identification of an object provided with same, effected by electromagnetic radiation, which is as free as possible from disturbing interactions with the object. It is a label with at least one antenna for the reception of an incoming electromagnetic signal.

The invention achieves this object by providing the labels with means which reduce the influence of stray capacitances caused by the object on the resonance characteristics of the label. Surprisingly, it turns out that the disturbances caused by the objects to be identified stem, in most cases, from the occurrence of so-called capacitive couplings between the resonant circuit of the label and the object. This occurs particularly when the object has metallic elements. These capacitive couplings result in a shift of the characteristic frequency of the resonant circuit, or of the entire absorption behavior of the label, which is to say that a so-called "detuning" takes place. This detrimental shifting of the absorption behavior can be decreased or even eliminated in an astonishingly simple and efficient manner by shielding these stray capacitances of the object from the label, thus minimizing their influence.

Of course, the type, strength, and characteristics of the stray capacitances depend on the frequency used. As a rule, the higher the frequency, the more dramatic becomes the influence of stray capacitances. In view of that, it can be seen according to one of the first embodiments of the invention that the shielding of stray capacitances given an electromagnetic signal in the radio frequency range (RF signal), and particularly in the range of 10-20 MHz, can be employed especially effectively, especially with a passive label.

According to a further embodiment of the invention, the object is an optical data medium, particularly a compact disc (CD) or a double versatile disc (DVD), or also a magneto-optical data medium (MO) such as, for example, a mini-disc. In optical data media, the stray capacitance stems particularly from the metallic reflective layer of the data medium. Precisely when conventional labels are affixed to such a data medium, namely, it could have been expected that the detuning would turn out to be especially strong and uncorrectable. Surprisingly, however, it turns out that it is possible in such objects to shield the capacitive coupling effect, or to minimize their influence.

The label is affixed, particularly, in such a manner that the data medium with label does not exhibit any disturbing out-of-balance during reading of the data medium.

In another preferred embodiment of the invention, the means for the prevention or at least reduction of the capacitive coupling is formed as an additional, dielectrically active layer arranged on the side of the label facing toward the object. Particularly when, as preferred, this layer has an especially low dielectric constant $\in_r$, such as, for example, in the range $\in_r$ of less than 2.5, and particularly preferred in the range $\in_r$ of less than 2, the desired effect can be achieved with astonishing simplicity and low cost. In so doing, the layer can be, unexpectedly, a simple paper layer with a dielectric constant that is as low as possible.

Preferably, the layer has a thickness in the range of 50-150 μm, and particularly preferred in the range of 100 μm.

According to another preferred embodiment of the invention, the means for the reduction of the capacitive coupling can consist in an increase of the capacitance of the resonance circuit of the label, in which the resonant frequency of the label is maintained essentially constant by setting the inductivity of the coil. Increasing the capacitance while decreasing the inductivity at a constant resonance frequency causes stray capacitances to exhibit, seen relatively, a smaller influence on the resonant behavior of the resonant circuit. Particularly when, as is customary according to the state of the art for RFID labels, the capacitance of the resonant circuit is integrated in the chip and hence cannot be enlarged off-hand, the increase in capacitance can be effected by the parallel attachment of an additional external capacitor outside the chip. In so doing, the increased total capacitance lies preferably in the range of 80-150 pF, and particularly in the range of 100 pF. In contrast, for capacitors integrated in the chip, values of over 50 pF are rarely reached, and already at 50 pF almost half of the chip surface is needed for the capacitor.

The desired increase in capacitance can also be expressed indirectly by the resulting wave resistance or impedance level (calculated from the square root of the relationship of the inductivity of the resonance circuit to its capacitance), which should be less than 200 ohm, and particularly less than 100 ohm.

The means described in the preceding for the reduction of the influence of stray capacitances stemming from the object can, alternatively but advantageously, be employed in combination with each other.

The invention relates moreover to a process for the manufacture of a label with dielectric layer as described above which is characterized in that an additional dielectric layer is affixed to an existing label on the side facing toward the object.

Furthermore, the invention relates to the use of a label as described above on an optical data medium, particularly a CD or a DVD or a magneto-optical data medium such as an MO for anti-theft security and/or identification.

Also pertaining to the invention is an optical data medium, particularly a CD or a DVD or a magneto-optical data medium such as an MO, which is provided with a label as described above, as well as a process for affixing a label as described above to an optical data medium.

Further embodiments of labels, processes for the manufacture of the labels, use of the labels, data media with labels, and processes for the manufacture of the data medium with label can be found in the dependent claims.

BRIEF DESCRIPTION OF THE DRAWINGS

In the following, the present invention will be explained in more detail by means of embodiments with reference to the drawings. In so doing, the embodiment examples focus solely on a CD. In the drawings.

DETAILED DESCRIPTION OF THE INVENTION

The present invention will be described by means of the example of the equipping of an existing library collection of CDs and DVDs with RFID labels.

For an automatic lending system in libraries, all materials must be provided with an RFID label so that visitors can process them at the self check-out stations. Those materials that are checked out properly may be taken out of the lending area. In order to prevent the removal of objects not checked out, a gate system is installed at the exit which reads the information in the RFID label and sounds an alarm for a non-checked-out status.

In CDs and DVDS, the problem arises that the reflective layer on the CD contains metal and impairs the function of the RFID labels. Moreover, the label should allow for reliable reading upon exit, that is to say, the transmitter(s) must also have the ability to identify the objects in a gate that is passable for the users. What's more, the label should not impair the use of the data media in playback devices.

It has been shown through experiments that the electrical conductivity of the optical reflective layer of CDs is surprisingly low enough that a functional, flexible RFID label can be affixed onto this area after appropriate adaptation. In fact, it would have been expected just at the RF frequency of 13.56 MHz that the shield effect of the metallic layer of the CD is so strong that a shielding off of it is impossible. Due to this prejudice, up to now there have only been attempts to embed RFIDs as early as the CD or DVD manufacturing process in the area surrounding the central hole which is free of the metallic layer, for example, or recesses or countersinks are made retroactively in order to mount the RFIDs.

Figure 1:
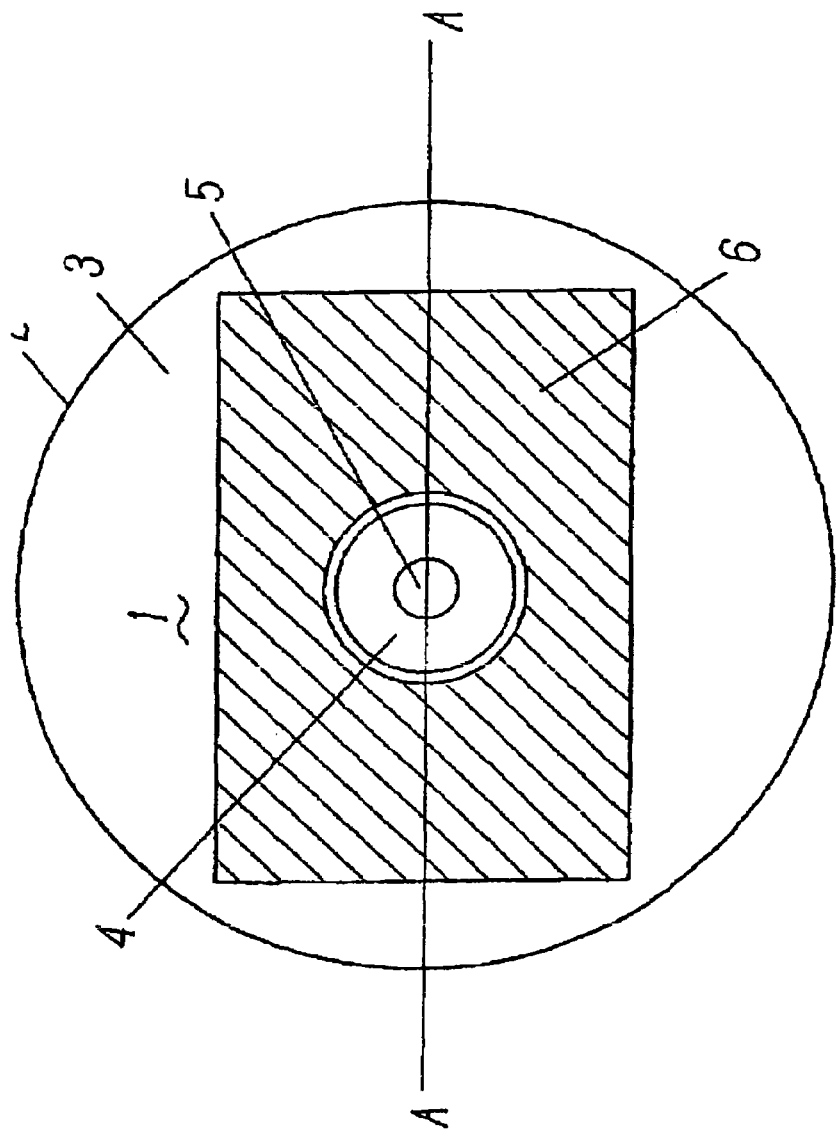
FIG. 1 shows a top view of a CD with affixed label.

FIG. 1 shows a CD 1 with an RFID label 6 affixed to the top side 3. The label 6 surrounds the central hole 5 of the CD and also leaves uncovered the transparent central area 4 of the CD, that is, the area having no metallic layer. The form and position of the label 6 on the CD 1 are chosen such that no out-of-balance occurs with respect to the CD and its rotation in the playback device. The form of the label has been specially chosen as a rectangle here because it is the most suitable for the manufacture of the labels. The label has a width of 50 mm and a length of 96 mm, and the central hole has a diameter of 25 mm.

Figure 2:
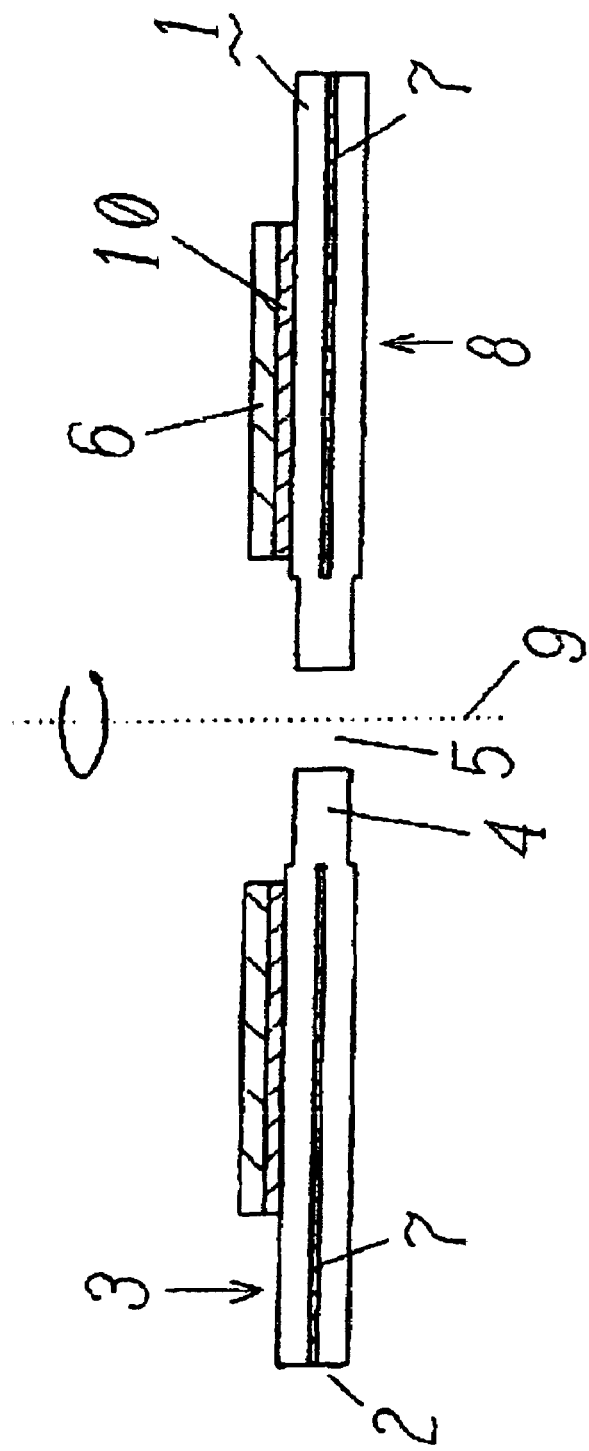
FIG. 2 shows a section through the CD along line A-A per FIG. 1.

FIG. 2 shows a perpendicular, central section through the CD along the line A-A in FIG. 1. Visible here is the metallic layer 7, which is chiefly responsible for stray capacitances. Located between label 6 and CD 1 is a layer 10 which effects a virtual capacitive insulation of the label from the CD. The layer 10 is made of a material with a low dielectric constant $\in_r$ of less than 2.5, and preferably even less than 2. To be considered are plastics such as polyethylene, polypropylene, and PVC, as well as simple paper. Paper of the quality 80 g/m$^2$ has proven to be particularly suitable. The paper 10 is first affixed to the label 6 using an adhesive with a low dielectric constant and low dielectric loss at high frequency, such as an acrylic adhesive, for example, and then the whole assembly is affixed onto the CD using, possibly, a commensurate adhesive. The thickness of the layer lies in the range of approximately 100 µm, so that the total height of the label 6 above the surface of the CD comes to preferably less than 500 µm.

Figure 3:
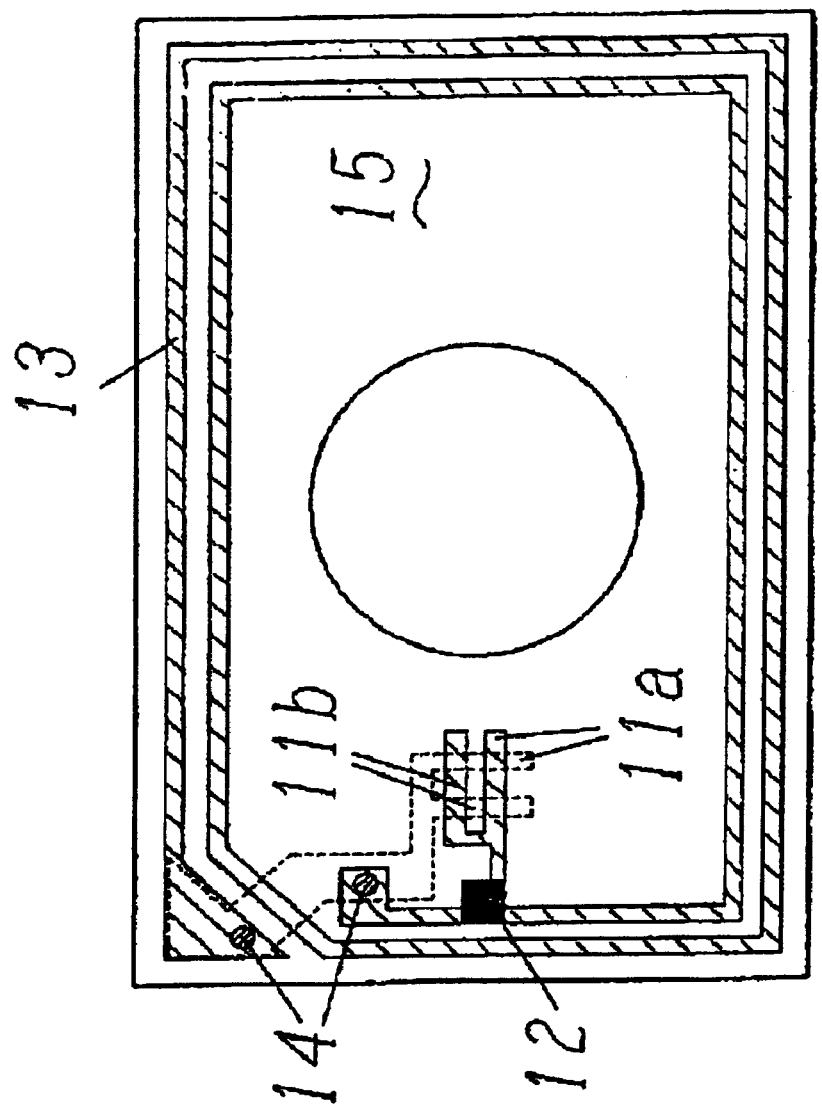
FIG. 3 shows a schematic representation of the resonant circuit of the label with additional capacitance.

In order to keep the influence of the stray capacitances to a minimum, the impedances of the resonant circuit in the label should be as low as possible. Preferably, an additional external capacitor is appropriately connected in parallel to the fixed chip capacitor. FIG. 3 shows a resonant circuit as used, for example, in the label described here. The label 6 encompasses a foil 15 which has aluminum circuit paths on the back side (dotted) and on the front side (bared, hatched). The circuit paths form an LC resonant circuit with coil 13 and condenser 11 which is closed over both through-connections 14 from the front side to the back side. Integrated in the circuit paths is a chip 12 which is responsible for the specific information. The condenser of the original label only comprised the conductor 11a; through the addition of the additional conductor 11b on the front and back side, new, capacitively active areas emerge which increase the capacitance to the level necessary for minimizing the influence of stray capacitances. Care should be taken that the circuit paths do not come to lie any closer than up to 10 mm from the outer edge of the CD.

A label of this type has the advantage, among others, that it features a greater reading distance in comparison to a small coil affixed only in the center of the CD, that is to say, transmitter and label can be further separated from one another at the time of reading. Distances of at least 40 cm between transmitter and labeled object can typically be reached; if there are two transmitters, this means that exits with a width of at least 80 cm become possible. Moreover, the label can be affixed retroactively through simple sticking on without causing an out-of-balance on the CD and without the need for countersinks.

LIST OF TERMS

1 Optical data medium, CD
2 Outer edge of 1
3 Top side of 1
4 Transparent area of 1
5 Central hole in 1
6 Label
7 Metallic layer on the CD
8 Bottom side of 1 (optical reading side)
9 Rotating axis of 1
10 Dielectric layer
11 Condenser
11a Previous condenser
11b Additional condenser
12 Chip
13 Coil circuit
14 Through-connections
15 Foil material

The invention claimed is:

1. A label for the wireless identification of an object provided with, effected by electromagnetic radiation, this label having at least one antenna for the reception of an incoming electromagnetic signal,
characterized in that
the label features means which reduce the influence of stray capacitances stemming from the object on the resonance characteristics of the label.

2. A label according to claim 1, characterized in that the electromagnetic signal is a radio frequency signal (RF signal), preferred in the range of 10-20 MHz, and furthermore, that it is particularly a passive label.

3. A label according to claim 1, characterized in that the object is an optical data medium, preferred a CD or a DVD or a magneto-optical data medium (MO), and that the stray capacitance is caused by the metallic reflective layer of the data medium, and in which the label is affixed in such a manner that the data medium with label does not exhibit any disturbing out-of-balance during reading of the data medium.

4. A label according to claim 1, characterized in that the means are an additional, dielectrically active layer arranged on the side of the label facing toward the object.

5. A label according to claim 4, characterized in that the layer has a low dielectric constant $\in_r$, preferred in the range $\in_r$ of less than 2.5, and preferred in the range $\in_r$ of less than 2.

6. A label according to claim 5, characterized in that the layer is a layer of paper.

7. A label according to claim 4, characterized in that the layer has a thickness in the range of 50-150 µm, and preferred in the range of 100 µm.

8. A manufacturing process for the manufacture of a label according to and claim 4, characterized in that an additional dielectric layer is affixed to an existing label on the side facing toward the object.

9. A manufacturing process according to claim 8, characterized in that condenser surfaces are provided for the additional capacitor on the label outside of an integrated circuit.

10. A process for affixing a label according to claim 4 on an optical data medium, preferred a CD or a DVD, or on a magneto-optical data medium (MO), characterized in that the layer is first affixed to the data medium and followed by a label which covers it.

11. A label according to claim 1, characterized in that the means effect the increase of the capacitance of the resonance circuit of the label, and the resonant frequency of the label is maintained constant by setting the inductivity of the coil.

12. A label according to claim 11, characterized in that the increase of the capacitance is effected by the parallel attachment of an additional capacitor to the existing capacitor of the resonant circuit of the label.

13. A label according to claim 11, characterized in that the increased total capacitance lies in the range of 80-150 pF, preferred in the range of 100 pF, and/or an impedance level for the resonant circuit of less than 200 ohm is chosen, preferred in the range of 100 ohm.

14. A use of a label according to claim 1 on an optical data medium, preferred a CD or DVD or on a magneto-optical data medium (MO) for anti-theft security and/or identification.

15. An optical data medium, particularly a CD or DVD or magneto-optical data medium such as an MO, provided with a label according to claim 1.

* * * * *